(12) United States Patent
Shen et al.

(10) Patent No.: US 9,083,756 B2
(45) Date of Patent: Jul. 14, 2015

(54) SESSION ANALYSIS SYSTEMS AND METHODS

(75) Inventors: Zeqian Shen, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 284 days.

(21) Appl. No.: 13/206,295

(22) Filed: Aug. 9, 2011

(65) Prior Publication Data

US 2012/0036256 A1 Feb. 9, 2012

Related U.S. Application Data

(60) Provisional application No. 61/372,057, filed on Aug. 9, 2010.

(51) Int. Cl.
*G06F 15/173* (2006.01)
*H04L 29/08* (2006.01)
*H04L 29/06* (2006.01)

(52) U.S. Cl.
CPC ............ *H04L 67/22* (2013.01); *H04L 67/025* (2013.01); *H04L 67/142* (2013.01); *H04L 67/36* (2013.01); *H04L 29/06* (2013.01)

(58) Field of Classification Search
None
See application file for complete search history.

(56) References Cited

U.S. PATENT DOCUMENTS

| 5,717,869 | A | * | 2/1998 | Moran et al. | 715/716 |
|---|---|---|---|---|---|
| 6,332,147 | B1 | * | 12/2001 | Moran et al. | 715/203 |
| 6,996,536 | B1 | * | 2/2006 | Cofino et al. | 705/26.8 |
| 7,954,152 | B2 | * | 5/2011 | Shiran | 726/22 |
| 8,413,250 | B1 | * | 4/2013 | Krynski | 726/26 |
| 2006/0075106 | A1 | * | 4/2006 | Hochmuth et al. | 709/227 |
| 2007/0252835 | A1 | * | 11/2007 | Kangru et al. | 345/440 |
| 2008/0086558 | A1 | * | 4/2008 | Bahadori et al. | 709/224 |
| 2010/0229112 | A1 | * | 9/2010 | Ergan et al. | 715/764 |
| 2012/0102101 | A1 | * | 4/2012 | Wenig et al. | 709/203 |

* cited by examiner

*Primary Examiner* — Jason K. Gee
*Assistant Examiner* — Olanrewaju Bucknor
(74) *Attorney, Agent, or Firm* — Schwegman Lundberg & Woessner, P.A.

(57) ABSTRACT

A method and system analyze session data. In some embodiments, the method accesses session data, identifies multiple sessions contained in the session data, and identifies multiple events that occurred within each of the multiple sessions. The method determines a temporal relationship between the multiple events in each session and analyzes the multiple sessions to aggregate events associated with the multiple sessions. The method then generates a graphical representation of the aggregated events.

13 Claims, 11 Drawing Sheets

902

Events:

Payment Review

Elapsed Time (seconds):

avg: 13.00 median: 14.50 min: 4.00 max: 22.50

Traffic:

25.57% of the total.
Success Rate: 85.38%

Inbound                Outbound

SESSION ANALYSIS SYSTEMS AND METHODS

RELATED APPLICATION

This application claims the priority benefit of U.S. Provisional Application Ser. No. 61/372,057, entitled "SYSTEM TO ANALYZE USER EXPERIENCE FROM WEBPAGE FLOWS", filed Aug. 9, 2010, the disclosure of which is incorporated herein by reference in its entirety.

TECHNICAL FIELD

The present disclosure generally relates to network communications and, more specifically, to systems and methods for analyzing session data.

BACKGROUND

Advancements in computer and networking technology enable users and entities to conduct various types of activities online via computer-based applications and systems. These online activities may include a sequence of events or steps performed by a user or an entity, such as an item purchase activity that involves completing multiple online forms or fields. Understanding user behavior when performing an activity is useful in modifying the sequence of events or steps to improve the results of the activity.

BRIEF DESCRIPTION OF THE DRAWINGS

Some embodiments are illustrated by way of example and not limitation in the figures of the accompanying drawings.

DETAILED DESCRIPTION

Example systems and methods to analyze session data are described. In the following description, for purposes of explanation, numerous specific details are set forth in order to provide a thorough understanding of example embodiments. It will be evident, however, to one skilled in the art that the present invention may be practiced without these specific details.

The session analysis systems and methods described herein allow users to view a graphical representation of session data. Session data refers to a series of steps, events or actions performed by a user when visiting a web site or performing another activity, such as an online activity. Example session data includes events that describe the actions performed by a user when conducting an online transaction, completing an online form, taking an online survey, and participating in other online activities that involve two or more steps performed by the user. The session data may include information provided by a user, buttons (or other visual indicators) activated by the user, an identification of steps completed by the user, keystrokes, and cursor and pointer movements, actions canceled by the user, and so forth. In one example, a particular session is represented as a time-stamped sequence of events (or steps), including a start time and an end time for each event. In this example, the session analysis systems and methods can determine the amount of time users spend completing each event in the sequence. At least one event in a session is defined as a "completion event" that identifies the end of the session. A session may also have an associated session result that includes, for example, a completed transaction, a failed transaction, a completed web-based form, a canceled web-based search, and the like.

A webpage flow is a type of session that includes a sequence of events (or steps) and ordering dependencies between the events, such as requesting payment information followed by confirming the payment information provided. Although particular examples discussed herein refer to webpage or website flow sessions, the teachings of the present invention are applicable to any type of session data associated with any type of activity or operation, such as a workflow.

The systems and methods described herein generate a user interface that presents a graphical representation of session data. The user interface also allows a user to control the graphical data presented by adjusting various display parameters and analysis parameters. As used herein, a "user" or an "entity" may be a person (e.g., a human), a business (e.g., a company), an organization, a group of people, a persona (e.g., a fictitious character), a bot, or any combination thereof.

Figure 1:
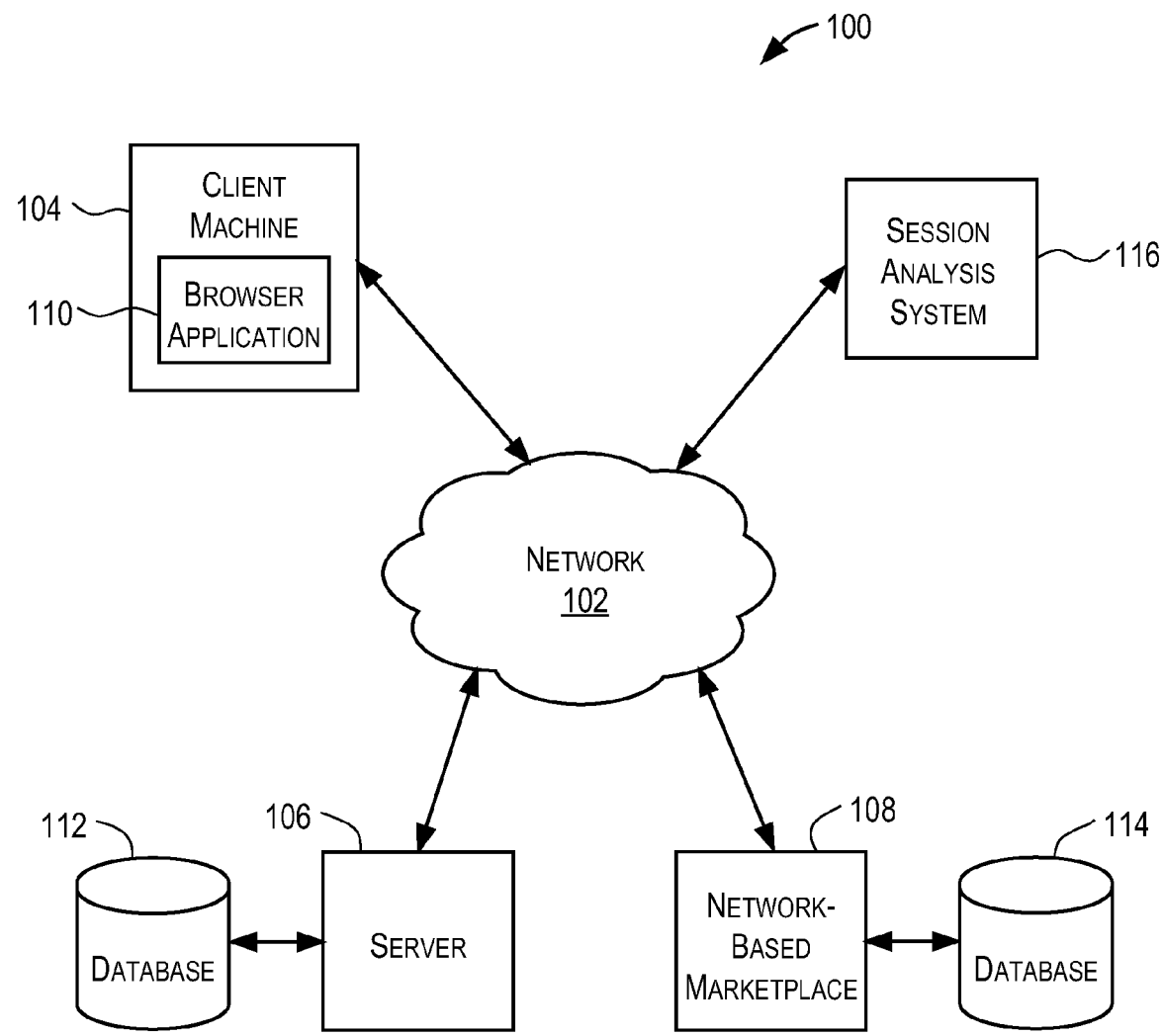
FIG. 1 is a block diagram depicting an example environment used to implement the systems and methods discussed herein.

FIG. 1 is a block diagram depicting an example environment 100 used to implement the systems and methods discussed herein. A network 102 (e.g., the Internet or a Wide Area Network (WAN)) allows multiple devices and systems to communicate with one another. Network 102 may include one or more wired and/or wireless networks coupled to one another, such as a Local Area Network (LAN) coupled to the Internet. A client machine 104, a server 106, and a network-based marketplace 108 are coupled to network 102. Client machine 104 includes a browser application 110 that is capable of interacting with other devices and system through network 102. For example, browser application 110 allows a user of client machine 104 to communicate with server 106 and network-based marketplace 108.

Server 106 includes any type of computing device capable of communicating with other systems and devices through network 102. The server 106 may be a hardware server or a software server hosted on a computing device. In particular embodiments, server 106 stores data to and receives data from a database 112. The data stored in database 112 is communicated from server 106 to other devices in response to data read request. Similarly, server 106 stores data received from other devices in response to data storage requests. In specific implementations, server 106 stores session data associated with activities performed on the server. In other implementations, server 106 receives and stores session data associated with activities performed on other devices or systems. In a particular embodiment, server 106 is a web server capable of generating web page data and communicating the web page data to other devices and systems through network 102.

Network-based marketplace 108 also includes a database 114 for storing various types of data. Network-based marketplace 108 is implemented using a one or more computing devices capable of implementing functions and operations associated with the marketplace. In particular embodiments, database 114 stores data associated with the network-based marketplace, such as marketplace listings, item information, user information, transaction information, and the like. In specific implementations, network-based marketplace 108 generates and stores session data associated with activities performed by users of the network-based marketplace. Example user activities include item purchase transactions, requests for information about an item, item bidding activities, item searching activities, and user registration activities. As discussed in greater detail below, these user activities often include multiple steps or actions performed by the user. These multiple steps/actions are collectively referred to as a session.

A session analysis system 116 is also coupled to network 102 and is capable of communicating with client machine 104, server 106, and network-based marketplace 108. Session analysis system 116 is implemented using a one or more computing devices capable of implementing various functions and operations discussed herein. In particular embodiments, session analysis system 116 receives session data from one or more systems or devices, such as server 106 and network-based marketplace 108. For example, session analysis system 116 can access session data from session logs stored in a database, server, network-based marketplace, web-based system, or other data source. As discussed in greater detail below, session analysis system 116 analyzes and aggregates (or summarizes) the session data to generate a user interface that displays at least a portion of the session data. In particular embodiments, this user interface is accessible by a user through a client machine, such as client machine 104. Any number of users can access session analysis system 116 through network 102 to receive session information or portions thereof. Although FIG. 1 illustrates session analysis system 116 as a separate system, in alternate embodiments the session analysis system is incorporated into another system or device, such as server 106 or network-based marketplace 108.

Figure 2:
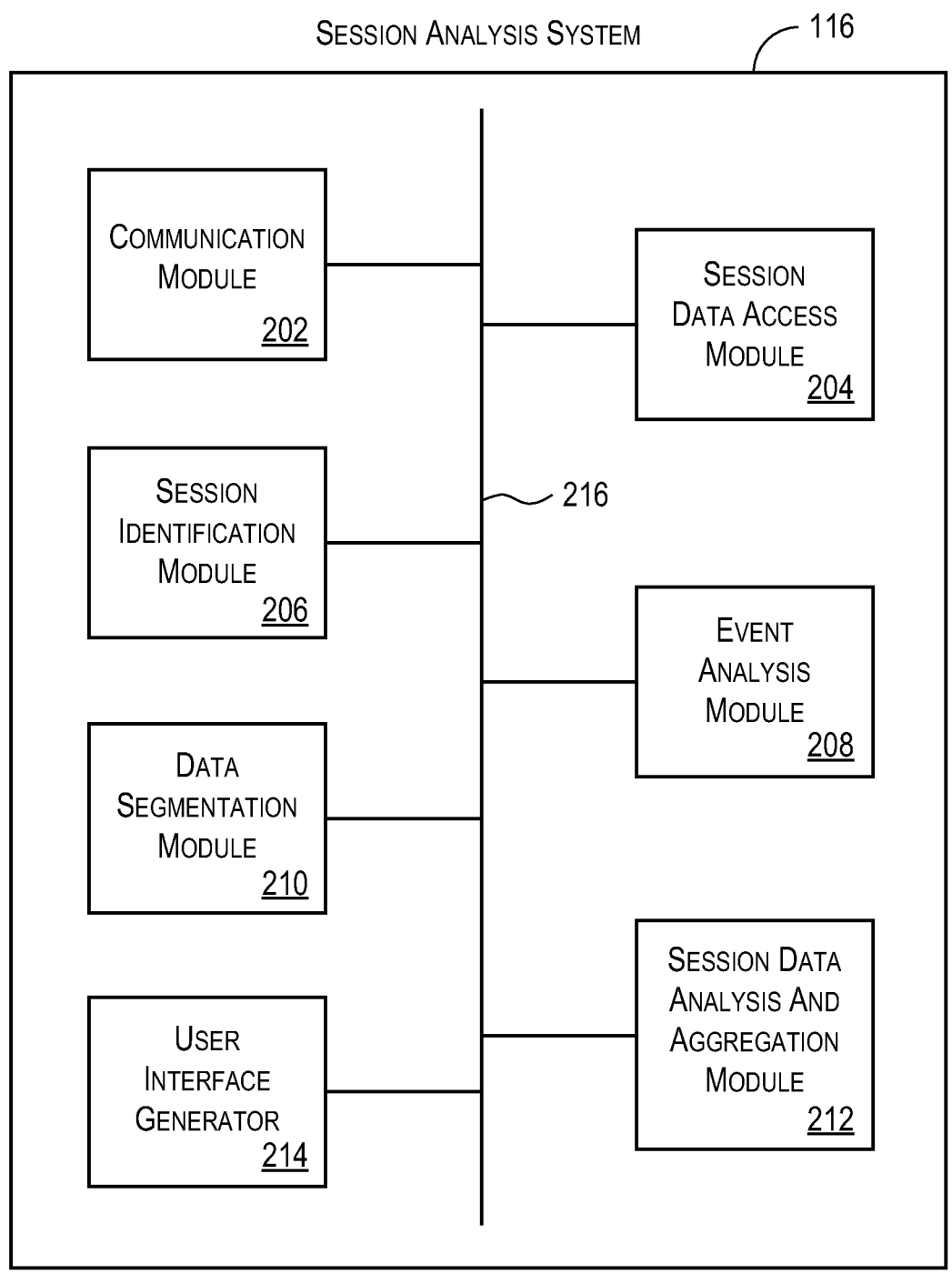
FIG. 2 is a block diagram of a session analysis system, in accordance with some embodiments of the present invention.

FIG. 2 is a block diagram of session analysis system 116, in accordance with some embodiments of the present invention. Session analysis system 116 may be executed or included in, for example, a server or other computing device. In various embodiments, session analysis system 116 implements hardware modules, computer programs, logic, applications, methods, processes, or software to perform the procedures discussed herein.

In the embodiment of FIG. 2, session analysis system 116 includes a communication module 202 and a session data access module 204. Communication module 202 communicates data between session analysis system 116 and other devices and systems, such as client machines, servers, and network-based marketplaces. Communication module 202 may support any number of different communication protocols using various communication media. Session data access module 204 accesses session data from one or more systems or devices, such as databases (e.g., database 112 and database 114), client machines, servers, and network-based marketplaces discussed herein.

Session analysis system 116 also includes a session identification module 206 that identifies individual sessions within session data received by session data access module 204. An event analysis module 208 identifies information related to events in a particular session, such as time stamp information and an event result. The time stamp information includes, for example, a start time and an end time associated with each event. Alternatively, the time stamp information may include a start time for each event, but not the end time. An event result includes information regarding a particular event, such as whether the event was completed successfully, whether the event failed, and so forth.

Session analysis system 116 further includes a data segmentation module 210 that determines which portions of received session data are analyzed and displayed through a user interface. Data segmentation module 210 allows a user to select certain portions of data for analysis and aggregation. A session data analysis and aggregation module 212 analyzes and aggregates (or summarizes) the received session data based on the data segmentation settings defined by a user, administrator or entity. In alternate embodiments, data analysis and aggregation module 212 analyzes and aggregates all of the received session data regardless of data segmentation settings. A user interface generator 214 creates a user interface to display session information (e.g., session analysis and aggregation results) to a user. In particular embodiments, user interface generator 214 may communicate data representing the user interface to another system (e.g., a client machine) for display or communicate the user interface data to a storage system for later retrieval and display by another device or system.

A communication bus 216 is coupled to the various modules and components in session analysis system 116, thereby allowing the modules and components to communicate with one another. Communication bus 216 may use any communication protocol and any communication media.

Figure 3:
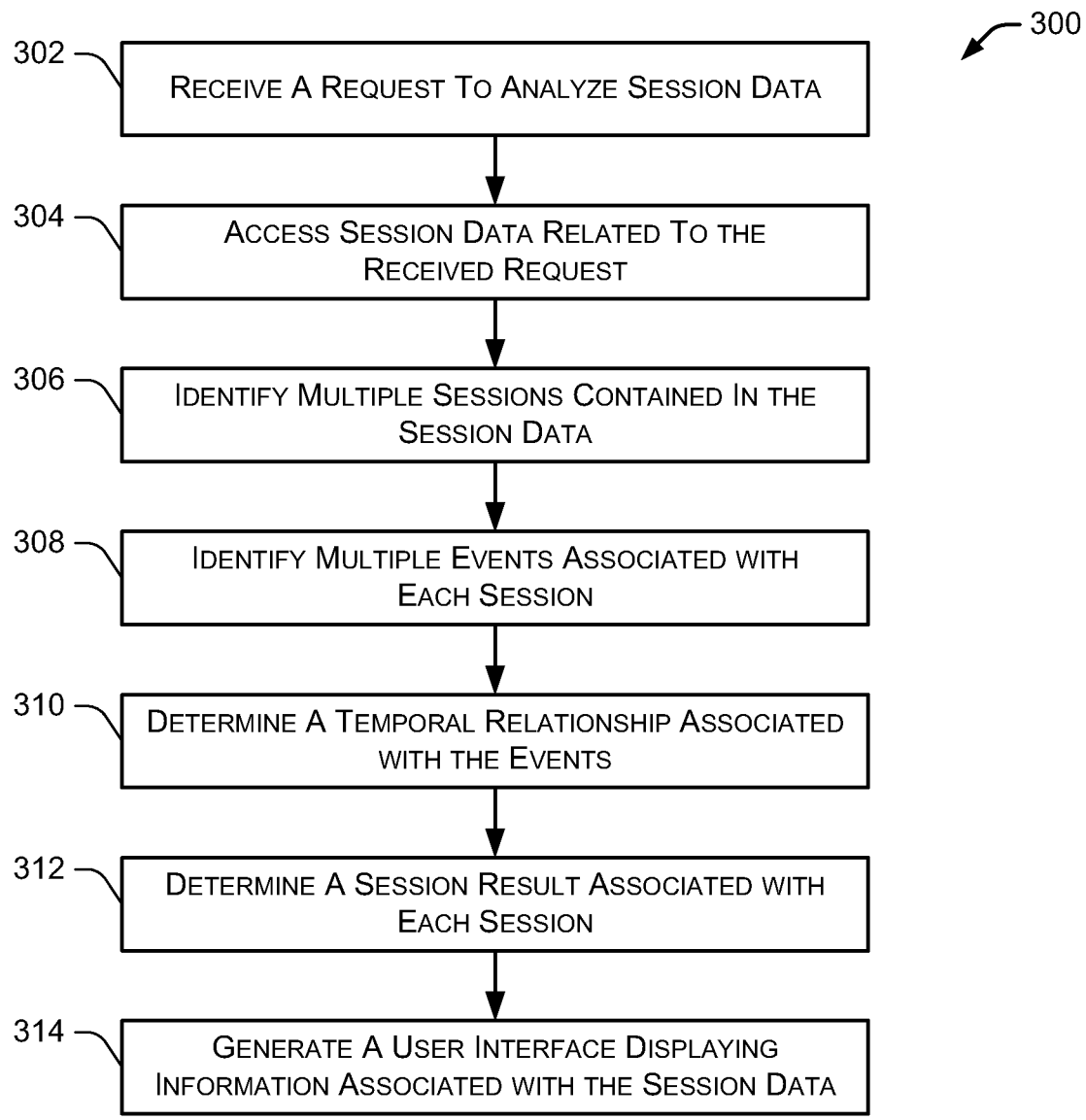
FIG. 3 is a flow diagram of a method, in accordance with an embodiment, of analyzing session data.

FIG. 3 is a flow diagram of a method 300, in accordance with an embodiment, of analyzing session data. In a particular embodiment, at least a portion of method 300 is implemented by a processor or computing system, such as one or more of the processors and computing systems discussed herein. Initially, a request is received to analyze session data at 302. The request may be received from a user, system or entity. In particular embodiments, the request identifies session data associated with specific types of transactions, web sessions or other types of sessions. For example, a request to analyze session data may identify sessions associated with a particular type of transaction in a network-based marketplace.

Method 300 continues by accessing session data related to the received request at 304. The session data is accessed, for example, from a server, network-based marketplace or other system that contains the requested session data. Multiple individual sessions are identified within the accessed session data at 306. The individual sessions include, for example, specific marketplace transactions or specific web sessions. The session data may contain information related to any number of individual sessions.

After identifying the individual sessions contained in the session data, method 300 identifies multiple events associated with each session at 308. As discussed herein, each session includes a sequence of events or steps. A temporal relationship associated with the events is also determined at 310. For example, based on the session data, method 300 is able to identify the specific events that occurred in each session as well as the duration (e.g., elapsed time) and temporal order of those events. In particular embodiments, each event has an associated time (e.g., timestamp) associated with the start time of the event and the end time of the event. This information is used to determine the temporal relationship between the multiple events in a session.

Next, method 300 determines a session result associated with each session at 312. As mentioned above, a session result includes, for example, a completed transaction, a failed transaction, a completed web-based form, a canceled web-based search, and the like. Optionally, method 300 also determines a result associated with each event or step in a session. Finally, method 300 generates a user interface displaying information associated with the session data at 314. As discussed in greater detail below, the user interface may include an aggregation of the session data based on a user-defined setting or other parameters.

Figure 4:
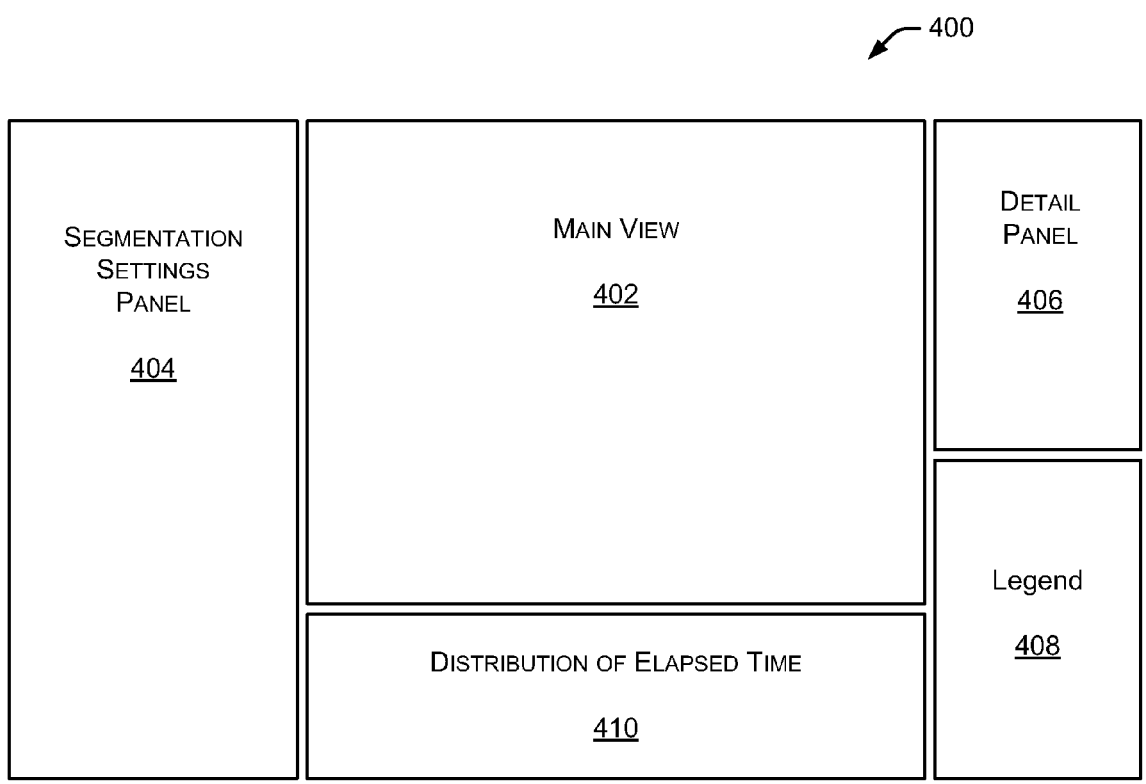
FIG. 4 depicts, in accordance with an embodiment, an example layout of a user interface for displaying various session data information.

FIG. 4 depicts, in accordance with an embodiment, an example layout of a user interface 400 for displaying various session data information. User interface 400 provides temporal user behavior patterns and other information (e.g., success rates based on one or more sessions) related to the analyzed session data. In the example of FIG. 4, user interface 400 includes a main view 402, a segmentation settings panel 404, a detail panel 406, a legend 408, and a distribution and elapsed time portion 410. As discussed in greater detail below, main view 402 displays a summary of session data aggregated from multiple sessions. Segmentation settings panel 404 displays current settings indicating which session data segments are being displayed. These segmentation settings can be adjusted by the user to select certain portions of session data for aggregation and display in main view 402.

Detail panel 406 displays details associated with a particular event that occurred in one or more sessions. Alternatively, detail panel 406 may display details associated with a different outcomes of an event that occurred in different sessions, such as payment success rates using different forms of payment. Legend 408 provides information to assist with interpreting the information displayed in other portions of the user interface. Elapsed time portion 410 includes information associated with the time spent by a user (or group of users) on a particular event or step in a session.

In particular embodiments, the information displayed in FIG. 4 is color-coded to distinguish, for example, different sessions or different events within a session. The user interface layout shown in FIG. 4 represents one example for presenting session data through a user interface. Alternate embodiments may include more or less user interface components arranged in any manner.

Figure 5:
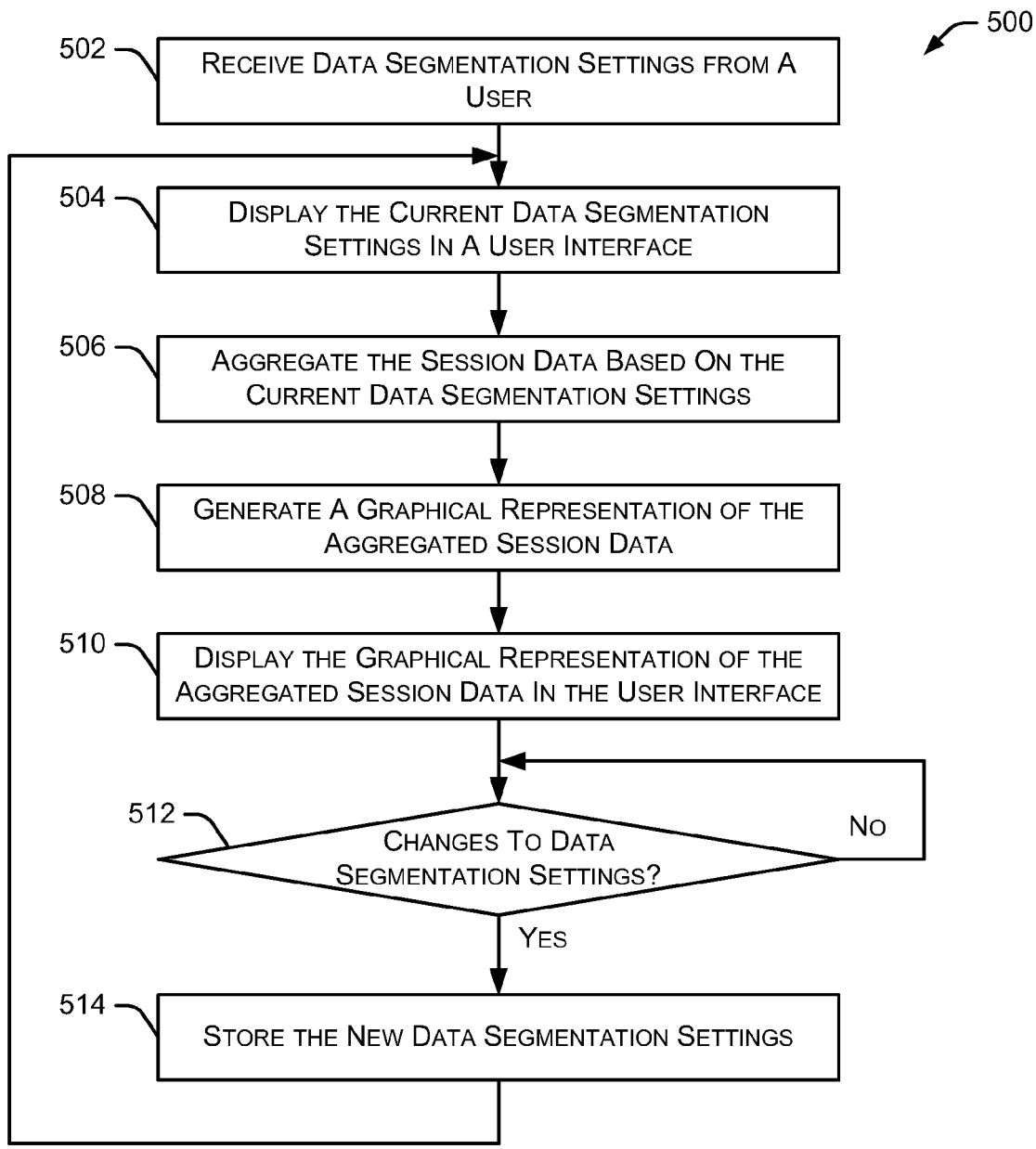
FIG. 5 is a flow diagram of a method, in accordance with an embodiment, of generating a graphical representation of aggregated session data.

FIG. 5 is a flow diagram of a method 500, in accordance with an embodiment, of generating a graphical representation of aggregated session data. In a particular embodiment, at least a portion of method 500 is implemented by a processor or computing system, such as one or more of the processors and computing systems discussed herein. Initially, data segmentation settings are received from a user at 502 (e.g., through the segmentation settings panel 404 of user interface 400 shown in FIG. 4). These data segmentation settings allow a user to select particular segments of the session data for analysis, such as specific demographic segments and user behavior characteristics. After data segmentation settings are received, those current settings are displayed in the user interface at 504.

Session data is then aggregated based on the current data segmentation settings at 506. In particular embodiments, aggregation of the session data includes a statistical summarization of the session data associated with the selected segments. Example data segmentation settings include those based on user information (such as geographic location, computer type, and domain from which a user accessed the online system), user demographics, and other segments of interest to a particular server, network-based marketplace, and the like. In a particular implementation of a network-based marketplace, segmentation settings may be based on user marketplace behavior, such as how long the user has bought/sold through the network-based marketplace, number of items bought/sold, and the types (e.g., categories) of items bought/sold.

In particular embodiments, prior to aggregating the session data, an analysis procedure of the type discussed above with respect to FIG. 3 is performed. After the session data is analyzed, the data is aggregated (e.g., summarized) based on current data segmentation settings. Method 500 then generates a graphical representation of the aggregated session data at 508. The graphical representation of the aggregated data is displayed in the user interface at 510. In particular embodiments, the graphical representation of the aggregated data is displayed in main view 402 of user interface 400 shown in FIG. 4.

Method 500 continues by determining whether changes are made to the segmentation settings at 512. If a change is detected, the new segmentation settings are stored at 514, and the procedure returns to 504 to display the new settings and update the aggregated data based on the new segmentation settings. Thus, the same session data can generate different graphical representations based on different segmentation settings by the user. The segmentation settings are particularly useful when analyzing large amounts of session data (e.g., data aggregated from thousands or tens of thousands of sessions). A user can change segmentation settings through the user interface and see a graphical representation of different segments of the same session data.

Figure 6:
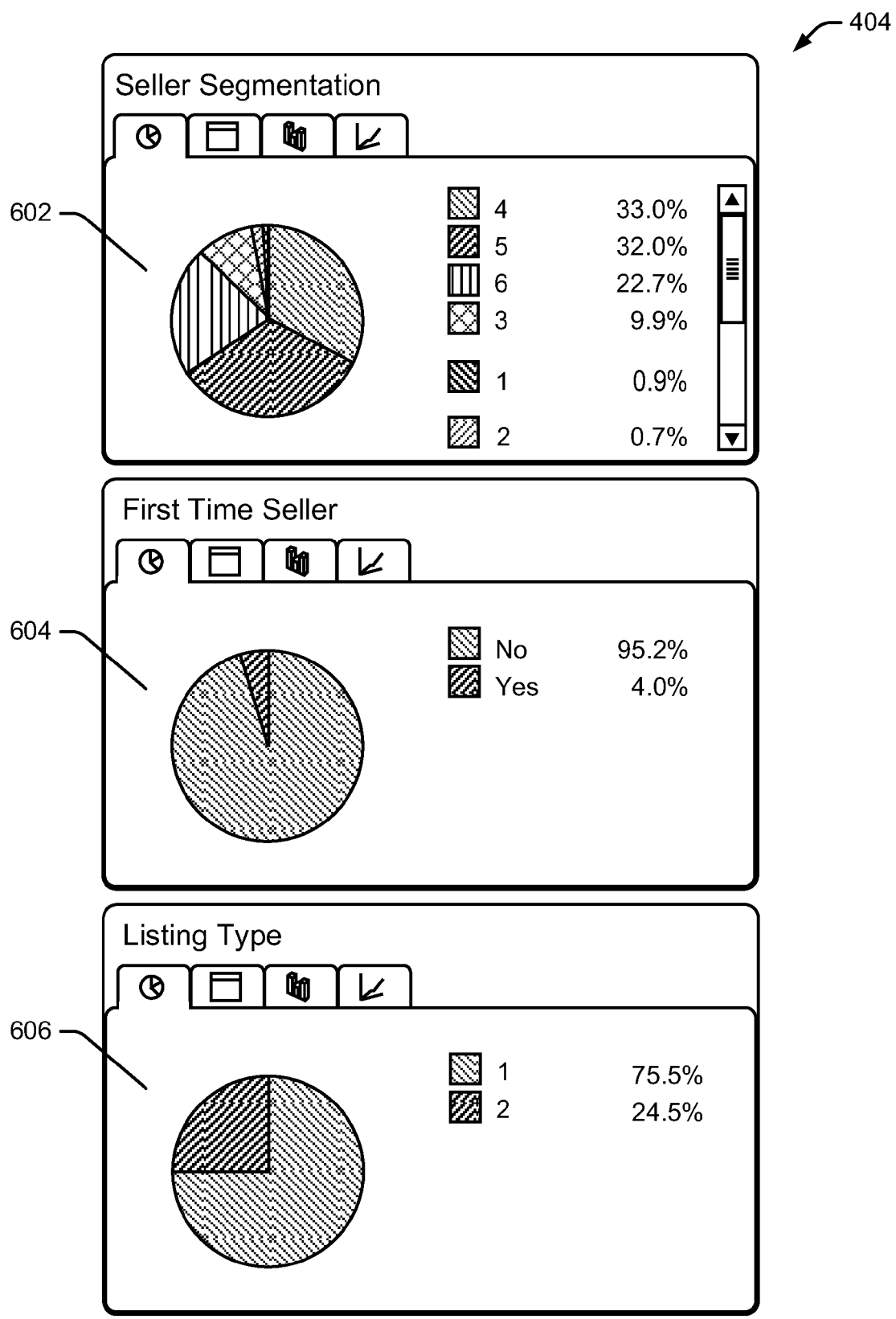
FIG. 6 depicts, in accordance with an embodiment, a portion of a user interface for displaying data segmentation settings.

FIG. 6 depicts, in accordance with an embodiment, an example of a segmentation settings panel 404 of a user interface. The setting options displayed in segmentation settings panel 404 vary depending on the type of session or process being analyzed. For example, when analyzing a selling session (or sales process), segmentation settings panel 404 displays options related to selling, such as the experience level of the seller and the category of item being sold. In the example of FIG. 6, segmentation settings panel 404 includes three separate sections 602, 604, and 606, each of which displays a different selling-related setting. Section 602 displays different categories of sellers based on their selling experience. The data shown in section is based on the current session data being analyzed.

In the example of FIG. 6, section 602 shows that 32% of sellers associated with the session data are "level 4 sellers" and 33% of sellers are "level 5 sellers." In this example, "level 4 sellers" and "level 5 sellers" identify sellers who sell a particular number of items each month or have particular customer feedback ratings. A user can change the data displayed in the other portions of the user interface by selecting one of the segments shown in section 602. For example, if a user selects the "level 4 sellers" (e.g., by clicking on the portion of the pie chart associated with level 4 sellers), this is a change in the segmentation settings. This change in settings generates an update to the information displayed in the other portions of the user interface. Thus, if a user wants to focus on sessions associated with level 4 sellers, selecting that portion of the pie chart in section 602 filters out all other categories of sellers from the aggregated and displayed information in the user interface. Filtering out other categories of sellers allows a user to view activities of a particular group of sellers during the selling process (e.g., viewing session data associated with the selected level 4 sellers).

Section 604 of FIG. 6 displays data identifying a percentage of sellers who are first time sellers in a particular marketplace. If a user wants to focus on first time sellers, they can click the "Yes" portion of the first time seller pie chart to limit the data displayed in the user interface to session data associated with first time sellers. Section 606 of FIG. 6 displays data identifying the manner in which a seller listed an item during the selling process, for example using a manual listing tool or using an automated listing tool. The user can focus on sellers using an automatic listing tool by clicking on an appropriate portion of the pie chart in section 606.

Figure 7:
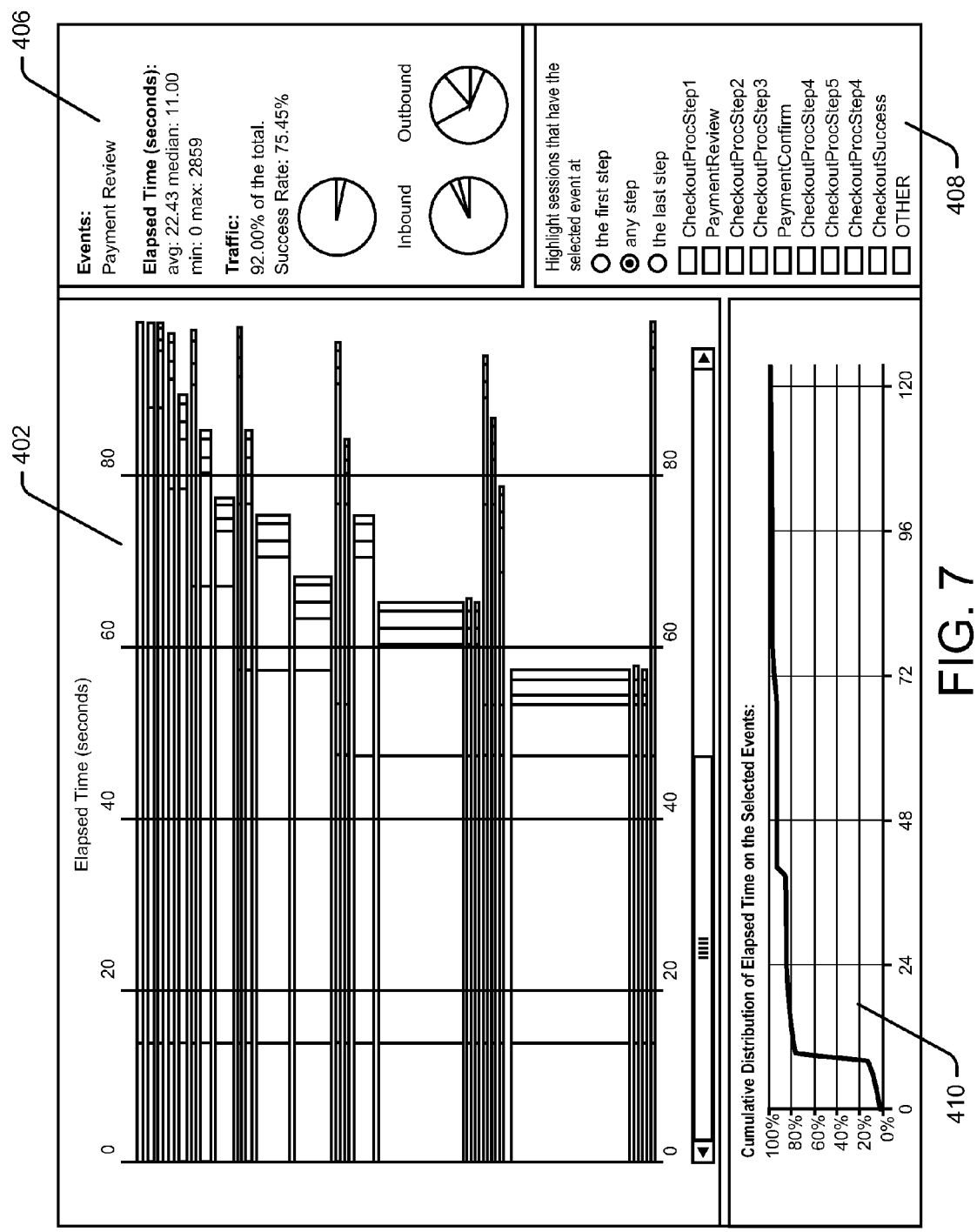
FIGS. 7-9 depict, in accordance with an embodiment, various portions of a user interface for displaying session data.
Figure 8:
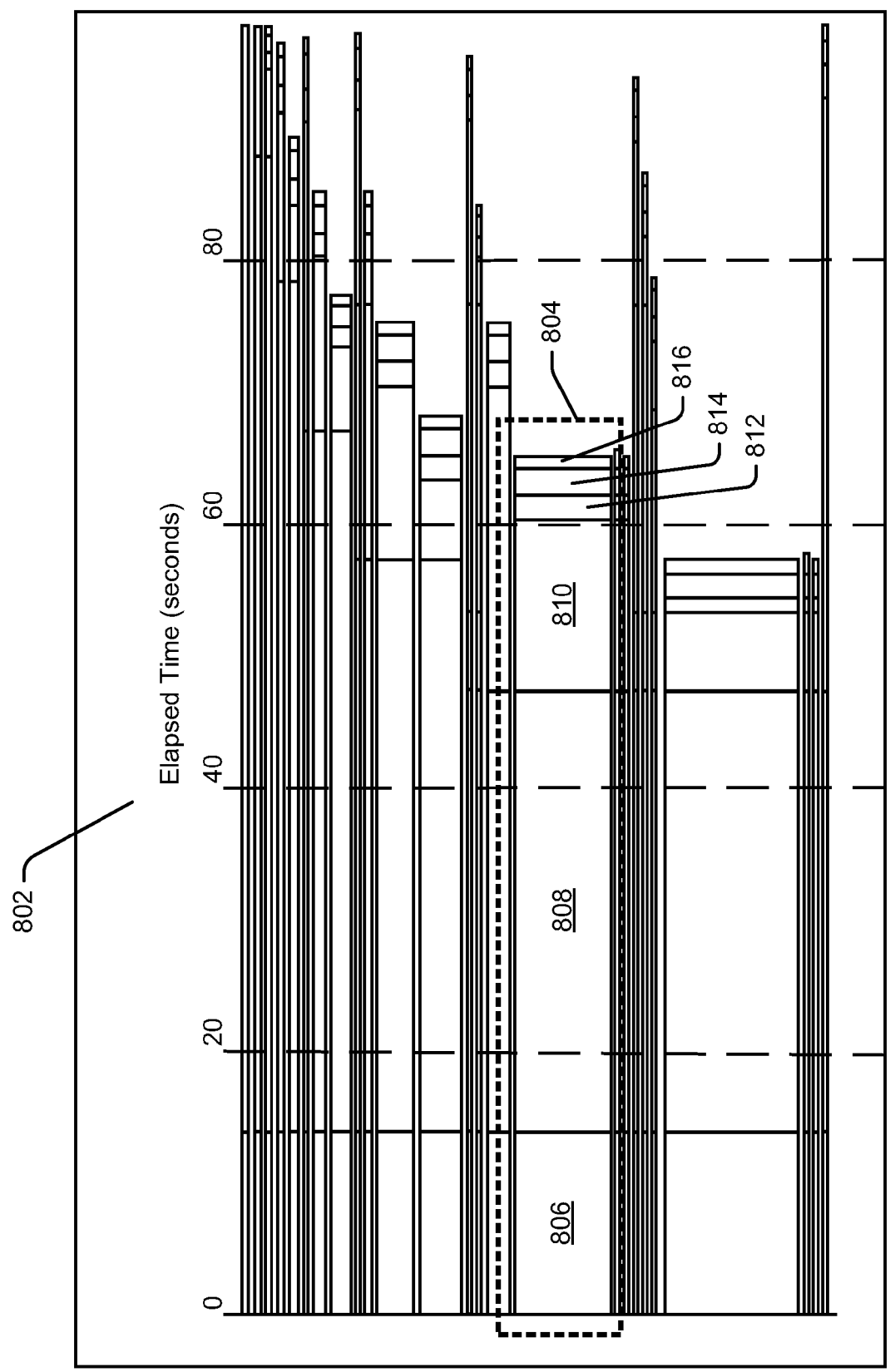
Figure 9:
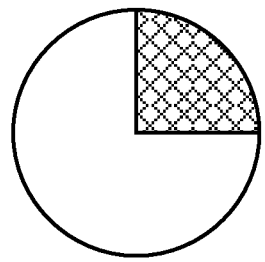
Figure 9:
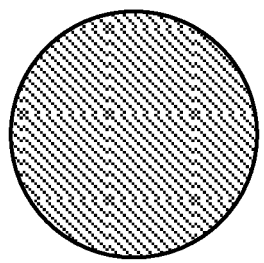
Figure 9:
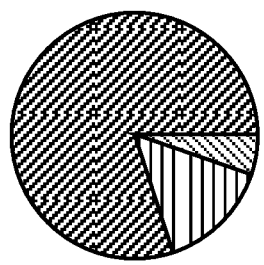

FIGS. 7-9 depict, in accordance with an embodiment, various portions of a user interface for displaying session data. In FIG. 7, examples of main view 402, detail panel 406, legend 408, and distribution of elapsed time portion 410 are shown. Specific examples of main view 402 and detail panel 406 are discussed below with reference to FIGS. 8 and 9. Legend 408 displays information to assist a user in interpreting the information displayed in other portions of the user interface. For example, legend 408 may include color coding information or other graphical indicators used in other portions of the user interface. In particular embodiments, legend 408 identifies various colors or patterns associated with different steps or events in a session. In the example of FIG. 7, legend 408 distinguishes between multiple steps in a sales process, including steps performed by a user in completing a purchase transaction.

Distribution and elapsed time portion 410 displays information related to the time spent by a user (or group of users) on a particular event or step in a session. The horizontal axis represents time (in seconds) and the vertical axis represents the percentage of users who spend an associated amount of time on a particular event. In the example of FIG. 7, distribution and elapsed time portion 410 indicates that approximately 75% of users spend less than 10 seconds on the selected event (the "Payment Review" event in this example). Knowing the amount of time users spend on each event in a session provides information regarding how easy (or intuitive) the event is to a typical user. For example, if most users spend a considerable amount of time on a particular event, that event may be a good candidate for review and analysis to improve the user experience with the associated session.

FIG. 8 depicts an example main view 802 of a user interface. Main view 802 includes multiple stacked horizontal bars, where each horizontal bar represents a particular type of session (e.g., a grouping of similar session data). The horizontal axis of the bar is divided into multiple portions with each portion representing a step or an event in a session. The horizontal width of each portion indicates an elapsed time (or average elapsed time) to complete the step or event associated with that portion. The greater the horizontal width of a portion, the greater the elapsed time to complete the associated step or event. The height of each bar indicates the number of sessions aggregated (or summarized) into the single horizontal bar. The greater the height of a particular horizontal bar, the greater number of sessions that are aggregated into the bar. The visualization in FIG. 8 allows a user to see the temporal patterns of individual steps or events within a session. In particular embodiments, the session data displayed in main view 802 is filtered such that portions of session data with few results are not shown. Instead, main view 802 displays types of sessions with a large number of data points.

If a user wants more detailed information regarding individual sessions, the user can select an event within the bar graph or select a particular event in the legend (e.g., legend 408 shown in FIG. 7). After a user selects a particular event in the legend (or bar graph), the detail panel (e.g., detail panel 406 in FIG. 7) is updated to include details associated with the selected event. A specific example of a detail panel is discussed below with respect to FIG. 9.

In FIG. 8, a particular horizontal bar is selected as an example for purposes of discussion. The selected horizontal bar is identified by a bounding box 804. The selected horizontal bar identifies multiple events that occur in temporal order as shown in FIG. 8. A first event is identified by reference numeral 806 and has a time duration of approximately 14 seconds. An event 808 begins at the completion of event 806 and ends at an elapsed time of approximately 46 seconds. After event 808 is complete, another event 810 begins and has a time duration of approximately 16 seconds. Three shorter events 812, 814, and 816 follow (in sequence) the completion of event 810. Events 812 and 814 have a time duration of approximately two seconds and event 816 has a time duration of approximately one second. Thus, a user viewing the selected horizontal bar (selected by bounding box 804) can visually see the relative time duration of the various events 806-816. If a particular event is considerably longer in duration relative to the other events, that information is shown visually. In the example of FIG. 8, event 808 has a considerably longer time duration than the other events. In this situation a user may investigate the reason for the longer time duration associated with event 808.

FIG. 9 depicts an example detail panel 902 of a user interface. Detail panel 902 includes details regarding a particular type of event contained in multiple sessions. The example of FIG. 9 is displaying details associated with a Payment Review event, which is part of a sale transaction. Detail panel 902 shows an details regarding the average, median, minimum, and maximum elapsed time to complete the Payment Review event. These elapsed time statistics are calculated based on the aggregated data associated with multiple sessions that include a Payment Review event. Detail panel 902 also includes information regarding the percentage of traffic (e.g., percentage of users who reached the Payment Review event). Additionally, detail panel 902 displays a success rate for the event (e.g., percentage of users who successfully complete the Payment Review event).

The "Inbound" chart shown in FIG. 9 identifies where traffic (e.g., users) were prior to reaching the selected event. In the example of FIG. 9, all users arrived at the selected event (Payment Review) from the same previous event, such as an "Enter Payment Information" event. The "Outbound" chart shows where users go after completing the selected event. In the example of FIG. 9, users go to one of three different events, such as "Correct Payment Information", "Confirm Payment Instructions" or "Cancel Transaction". The inbound and outbound information is useful in analyzing user decisions when moving between different events in a session.

Figure 10:
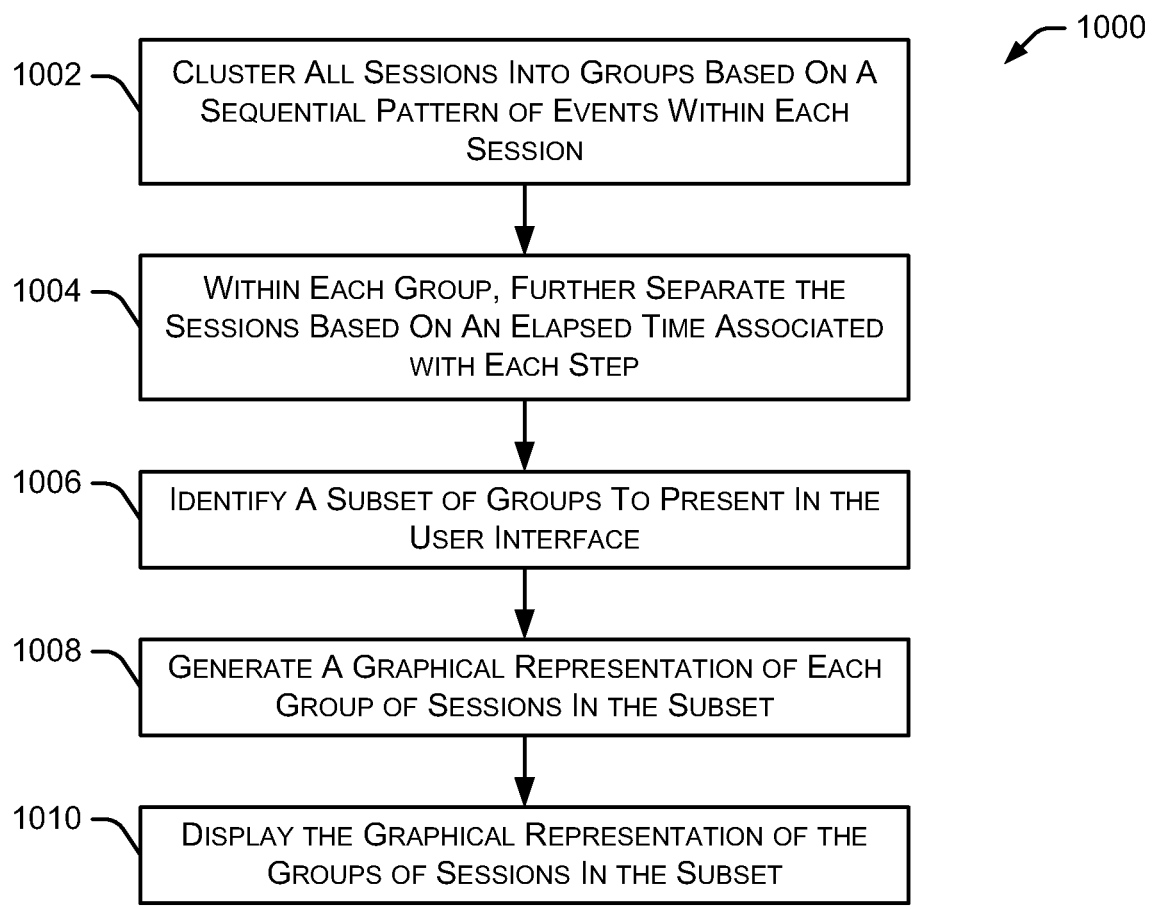
FIG. 10 is a flow diagram of a method, in accordance with an embodiment, of clustering session data into groups.

FIG. 10 is a flow diagram of a method 1000, in accordance with an embodiment, of clustering session data into groups. In a particular embodiment, at least a portion of method 1000 is implemented by a processor or computing system, such as one or more of the processors and computing systems discussed herein. When large amounts of session data are being analyzed, the session data is clustered into groups to provide a more manageable set of data to process for display.

Method 1000 begins by clustering all sessions into groups based on a sequential pattern of events within each session at 1002. Various clustering procedures may be used to create groups and subgroups associated with the session data. In particular embodiments, an iterative process is used. For example, sessions are first grouped by the types of their first events. Next, within each of the first groups, sessions are further grouped (e.g., sub-grouped) by the types of their second events. By iterating through all the steps in a session, a grouping (or clustering) hierarch is generated.

Within each group, the sessions are further separated based on an elapsed time associated with each step at 1004. In particular embodiments, this further separation is performed based on temporal ranges, such as 0-10 seconds, 11-20 seconds, and so forth. The size of these temporal ranges may be defined by an operator or administrator of the system based on their experience with various sessions. In other implementations, the sizes of the temporal ranges are defined by a user or by the session analysis system.

Method 1000 continues by identifying a subset of groups to present in the user interface at 1006. In particular implementations, the subset of groups is identified based on the segmentation settings (e.g., defined in segmentation settings panel 404). A graphical representation of each group of sessions in the subset is generated at 1008 and displayed at 1010. An example of this graphical representation is shown in FIG. 8.

In a particular example, the systems and methods discussed herein are useful in analyzing a checkout session (also referred to as a "checkout flow") associated with the purchase of an item. The example checkout session has three events performed in the following temporal order: payment review, payment confirm, and checkout success. The payment review event allows a user to revise a payment amount or payment method. Next, the user is asked to confirm the payment details at the payment confirm event. If the user reaches the checkout success event, the checkout session result is considered a success. Each of the events is important to achieving a successful checkout session and are performed in a particular order. In this example, the systems and methods discussed herein analyze the three events in multiple checkout sessions to identify, for example, patterns associated with a successful checkout or a failed checkout. In particular sessions, the analysis may indicate a relationship between the elapsed time in one or more events and the success rate of the checkout session. For example, when users spend more time on the payment review event, the likelihood of a successful checkout session decreases. This knowledge allows a system developer or administrator to modify the payment review event (e.g., modify the web page or user interface associated with that event) to decrease the amount of time a user spends performing that event.

In another example, the systems and methods discussed herein are useful in analyzing a registration session (also referred to as a "registration flow") associated with establishing an online account. The example registration session includes multiple events that are completed in a defined order by a user. If the user becomes frustrated at any of the events and leaves the session, the registration is not successful. In this example, the session includes a "select country" event that asks the user to identify their country of residence. The web page (or user interface) associated with the select country event lists several countries by default. However, if the user does not reside in one of these countries, they are directed to a different event (e.g., a different web page or different portion of the user interface) to select from a list of all available countries. In this example, the systems and methods discussed herein analyze the events in multiple registration sessions to identify patterns associated with a successful registration session or a failed registration session. In particular sessions, the analysis may indicate a relationship between registration session success and whether the user's country is listed on the default country list. For example, if a user's country of residence is not listed on the default country list, a significant number of users may terminate the registration session. This knowledge allows a system developer or administrator to modify the select country event to decrease the number of users who terminate the registration session.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
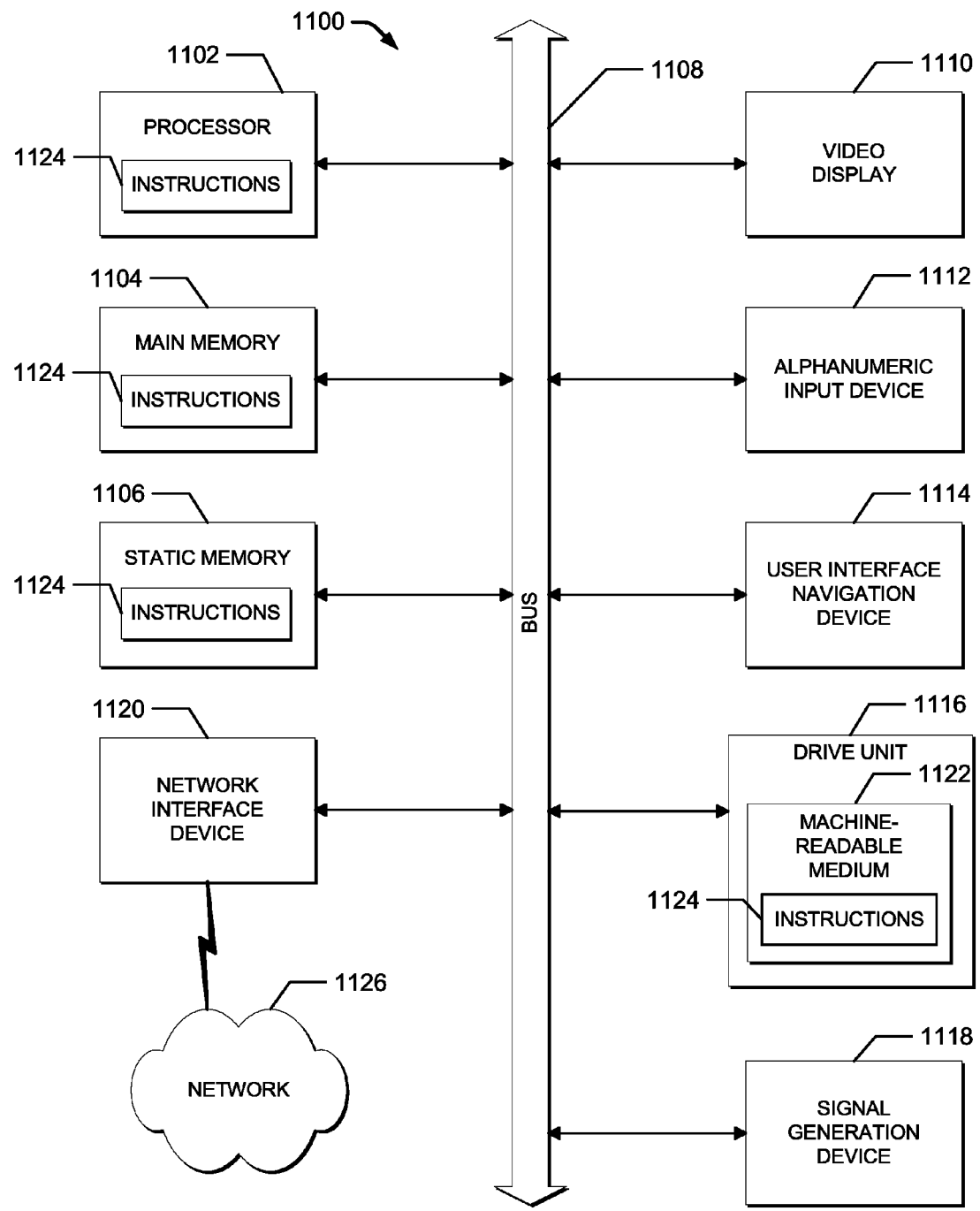
FIG. 11 is a block diagram of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1100 includes a processor 1102 (e.g., a central processing unit (CPU), a graphics processing unit (GPU) or both), a main memory 1104, and a static memory 1106, which communicate with each other via a bus 1108. Computer system 1100 may further include a video display unit 1110 (e.g., a liquid crystal display (LCD) or a cathode ray tube (CRT)). Computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Disk drive unit 1116 includes a machine-readable medium 1122 on which is stored one or more sets of instructions and data structures (e.g., software) 1124 embodying or utilized by any one or more of the methodologies or functions described herein. Instructions 1124 may also reside, completely or at least partially, within main memory 1104, within static memory 1106, and/or within processor 1102 during execution thereof by computer system 1100, main memory 1104 and processor 1102 also constituting machine-readable media.

While machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices;

magnetic disks such as internal hard disks and removable disks; magneto-optical disks; and CD-ROM and DVD-ROM disks.

Instructions 1124 may further be transmitted or received over a communications network 1126 using a transmission medium. Instructions 1124 may be transmitted using network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing session data;
   identifying a plurality of sessions contained in the session data;
   identifying a plurality of events that occurred within each of the plurality of identified sessions;
   determining a temporal relationship between the plurality of identified events in each session, the determining of the temporal relationship including determining an elapsed time to complete each of the plurality of identified events;
   aggregating, using one or more processors, the plurality of identified sessions based on a user-defined data segmentation setting, the user-defined data segmentation setting including a restriction on the type of session data analyzed, the aggregating of the plurality of identified sessions including statistically summarizing the plurality of identified events that occurred within the plurality of identified sessions; and
   generating a user interface including a graphical representation of the aggregated plurality of identified sessions, the graphical representation of the aggregated plurality of identified sessions being divided into multiple portions, each portion of the multiple portions representing an event of the plurality of identified events, each portion of the multiple portions including an indicator of a number of sessions aggregated into the portion and an indicator of the elapsed time to complete the event.

2. The method of claim 1, further comprising determining a session result associated with each of the plurality of identified sessions.

3. The method of claim 2, wherein the aggregating of the plurality of identified sessions includes aggregating the session results associated with the plurality of identified sessions.

4. The method of claim 1, wherein determining the temporal relationship includes determining a start time and an end time associated with each of the plurality of identified events.

5. The method of claim 1, wherein the session data is accessed from a web-based session log.

6. The method of claim 1, wherein the session data represents an instance of a webpage flow.

7. The method of claim 1, wherein the events associated with each of the plurality of identified sessions include user actions.

8. The method of claim 1, further comprising separating the plurality of sessions into groups based on the temporal relationship between the plurality of identified events in the sessions.

9. A non-transitory machine-readable storage medium comprising instructions that, when executed by one or more processors of a machine, cause the machine to perform operations comprising:
   accessing session data;
   identifying a plurality of sessions contained in the session data;
   identifying a plurality of events that occurred within each of the plurality of identified sessions;
   determining a temporal relationship between the plurality of identified events in each session, the determining of the temporal relationship including determining an elapsed time to complete each of the plurality of identified events;
   separating the plurality of sessions into groups based on the temporal relationship between the plurality of identified events in the sessions;
   aggregating the plurality of identified sessions based on a user-defined data segmentation setting, the user-defined data segmentation setting including a restriction on the type of session data analyzed, the aggregating of the plurality of identified sessions including statistically summarizing the plurality of identified events that occurred within the plurality of identified sessions; and
   generating a user interface including a graphical representation of the aggregated plurality of identified sessions, the graphical representation of the aggregated plurality of identified sessions being divided into multiple portions, each portion of the multiple portions representing an event of the plurality of identified events, each portion of the multiple portions including an indicator of a number of sessions aggregated into the portion and an indicator of the elapsed time to complete the event.

10. The non-transitory machine-readable storage medium of claim 9, wherein the session data is accessed from a network-based marketplace.

11. The non-transitory machine-readable storage medium of claim 9, wherein determining the temporal relationship includes determining a start time and an end time associated with each of the plurality of identified events.

12. A session analysis system comprising:
  a communication module to access session data associated with online activities;
  a session identification module to identify a plurality of sessions contained in the session data;
  an event analysis module to identify a plurality of events that occurred within each of the plurality of identified sessions and to determine an elapsed time to complete each of the plurality of identified events;
  a session analysis module, comprising a processor of a machine, to aggregate the plurality of identified sessions based on at least one user-defined data segmentation setting, the at least one user-defined data segmentation setting including a restriction on the type of session data analyzed, the aggregating of the plurality of identified sessions including statistically summarizing the plurality of identified events that occurred within the plurality of identified sessions; and
  a user interface generator to generate a user interface including graphical representation of the aggregated plurality of identified sessions, the graphical representation of the aggregated plurality of identified sessions being divided into multiple portions, each portion of the multiple portions representing an event of the plurality of identified events, each portion of the multiple portions including an indicator of a number of sessions aggregated into the portion and an indicator of the elapsed time to complete the event.

13. The session analysis system of claim 12, further comprising a data segmentation module configured to separate the plurality of sessions into groups based on the temporal relationship between the plurality of identified events in the sessions.

* * * * *